(12) United States Patent
Eiselt et al.

(10) Patent No.: US 9,344,213 B2
(45) Date of Patent: May 17, 2016

(54) METHOD FOR TUNING A TUNABLE OPTICAL TRANSMITTER IN AN OPTICAL WDM TRANSMISSION SYSTEM AND CORRESPONDING OPTICAL WDM TRANSMISSION SYSTEM

(71) Applicant: ADVA Optical Networking SE, Meiningen (DE)

(72) Inventors: Michael Eiselt, Kirchheim (DE); Jörg-Peter Elbers, Fürstenfeldbruck (DE)

(73) Assignee: ADVA Optical Networking SE, Meiningen (DE)

( * ) Notice: Subject to any disclaimer, the term of this patent is extended or adjusted under 35 U.S.C. 154(b) by 76 days.

(21) Appl. No.: 14/190,887

(22) Filed: Feb. 26, 2014

(65) Prior Publication Data

US 2014/0247840 A1 Sep. 4, 2014

(30) Foreign Application Priority Data

Mar. 1, 2013 (EP) ..................................... 13001051

(51) Int. Cl.
*H04J 14/00* (2006.01)
*H04J 14/02* (2006.01)
(Continued)

(52) U.S. Cl.
CPC ........ *H04J 14/0227* (2013.01); *H04B 10/0779* (2013.01); *H04B 10/2575* (2013.01); *H04J 14/0258* (2013.01); *H04J 14/0276* (2013.01);
(Continued)

(58) Field of Classification Search
None
See application file for complete search history.

(56) References Cited

U.S. PATENT DOCUMENTS

2003/0165286 A1   9/2003  Ikushima et al.
2008/0267627 A1  10/2008  Effenberger
2009/0202196 A1*  8/2009  Kish et al. ................. 385/14
(Continued)

FOREIGN PATENT DOCUMENTS

EP   2506476 A1   10/2012
EP   2573961 A1    3/2013

OTHER PUBLICATIONS

Roppelt et al.: "Tuning Methods for Uncooled Low-Cost Tunable Lasers in WDM-PON"; 2011; Optical Society of America.

*Primary Examiner* — Frank Duong

(57) ABSTRACT

An optical WDM transmission system including a plurality of first optical transceivers at a first end of an optical WDM transmission link, each including a tunable optical transmitter being adapted to create a first digital optical channel signal within the bandwidths of a set of first optical channels of the system according to tuning control information. The first channels are multiplexed in to a first WDM signal and supplied at the first end of the WDM link. Second optical transceivers at a second end link each include a transmitter adapted to create a second digital optical channel signal within a channel bandwidth of a second set of optical channels of the system. The second channels are multiplexed into a second WDM signal for transmission to the first transceivers, and demultiplexing there. A central tuning device creates the tuning control information for the first optical transceivers by tapping off an optical WDM detection signal from the first signal, extracting tuning status information from the optical WDM detection signal and determining tuning control information for at least one of the first transceivers. The central tuning device also supplies the tuning control information to the at least one first transceiver by modulating the second signal according to the tuning control information applying an amplitude modulation of the second signal using a dedicated WDM tone frequency.

18 Claims, 7 Drawing Sheets

(51) Int. Cl.
  *H04B 10/2575* (2013.01)
  *H04B 10/077* (2013.01)
(52) U.S. Cl.
  CPC ....... *H04J 14/0279* (2013.01); *H04B 2210/074* (2013.01)

(56) References Cited

U.S. PATENT DOCUMENTS

2010/0290785 A1  11/2010  Hindertür et al.
2013/0251364 A1*  9/2013  Pachnicke et al. .............. 398/32

* cited by examiner

METHOD FOR TUNING A TUNABLE OPTICAL TRANSMITTER IN AN OPTICAL WDM TRANSMISSION SYSTEM AND CORRESPONDING OPTICAL WDM TRANSMISSION SYSTEM

CROSS-REFERENCE TO RELATED APPLICATIONS

This Application claims the benefit of European Application No. 13 001 051.5, filed Mar. 1, 2013, which is incorporated by reference herein in its entirety.

STATEMENT REGARDING FEDERALLY SPONSORED RESEARCH OR DEVELOPMENT

Not Applicable.

BACKGROUND OF THE INVENTION (1) Technical Field of the Invention

The invention relates to an optical WDM transmission system including a plurality of first optical transceivers at a first end of an optical WDM transmission link which are to be tuned such that the individual center wavelength of each channel signal created by the first optical receivers lies within a dedicated optical channel of the optical WDM transmission system and/or is controlled such that the position of the center wavelength within the dedicated optical channel is optimized. Further, the invention relates to a suitable method for tuning a tunable optical transmitter in an optical WDM transmission system as well as to a central tuning device and a first optical transceiver for a respective optical WDM transmission system.

(2) Description Of Related Art

In most optical data transmission applications using optical wavelength division multiplexing (WDM), the wavelengths of the optical transmitters (mostly lasers) need to be locked to dedicated channel wavelengths, for example according to the ITU wavelength grid with optical frequencies spaced by 100, 50, or 25 GHz. For this purpose, wavelength lockers are available using optical filter devices, like etalons, which are periodic with the ITU frequency spacing. The known methods for locking the wavelength or optical frequency of a transmit signal to a dedicated channel frequency use a fixed relative position of the periodical optical transfer function of an optical filter device in order to lock the frequency of the transmitter unit to a fixed position of the respective transmission band of the filter. This fixed position usually corresponds to a center point between the minimum and the maximum point of the filter transfer characteristic.

The non pre-published prior European patent application 11 401 589 describes a method and device for locking the optical wavelength or frequency of a plurality of narrow-band optical channel transmit signals created by a plurality of optical transceivers to a dedicated optical channel frequency, the channel transmit signals having arbitrary channel frequency spacings, which allows the use of readily available optical filter devices having a transfer function with a different periodicity. Here, a common locking or tuning device is used which creates respective tuning control signals for the tunable optical transmitters. These tuning control signals are directly supplied to the respective optical transmitters. In order to create the tuning control signals, an optical WDM detection signal is tapped off from the optical WDM signal including all of the digital optical channel signals. If more than one digital optical channel signal is included in the optical WDM detection signal, the digital optical channel signals are amplitude-modulated with a given low modulation frequency (small as compared to the bitrate) and a given predetermined small modulation depth. Thus, the tapped-off optical WDM detection signal, which includes the amplitude-modulated digital optical channel signals, can be detected at the central tuning device in a phase-sensitive manner. This makes it possible to determine a tuning control information separately for each of the digital optical channel signals included in the optical WDM signal or optical WDM detection signal, respectively.

Using such a central tuning device saves cost as compared to conventional tunable optical transceivers which usually include a separate wavelength control and wavelength stabilization for each transceiver. The required components, like wavelength lockers, thermo-electric coolers (TEC) contribute to this cost. Additionally, the characterization of each transceiver module to determine the tuning parameters essentially contributes to the overall cost. However, this proposed use of a central tuning device requires to locate the central tuning device close to the optical transmitters to be controlled.

BRIEF SUMMARY OF THE INVENTION

It is thus an object of the present invention to provide an optical WDM transmission system in which a plurality of tunable optical transmitters can be controlled from a remote location and which can be realized at low cost. It is a further object of the invention to provide a method for remotely tuning a plurality of tunable optical transmitters in an optical WDM transmission system which can be implemented at low cost. Finally, it is an object of the invention to provide a central tuning device and optical transceivers which are suitable for realizing such a method and an optical WDM transmission system.

According to the present invention, a central tuning device is used which can be located remote from the transceivers including the tunable optical transmitters and which is adapted to create the tuning control information for one or more selected or all of the first optical transceivers by tapping off an optical WDM detection signal from the first optical WDM signal and by extracting a tuning status information from the optical WDM detection signal and determining tuning control information for at least one of the first transceivers. The central tuning device is further adapted to supply the tuning control information to the at least one first transceiver by modulating the second optical WDM signal according to the tuning control information. For this purpose, an amplitude modulation of the second optical WDM signal is applied, which is transmitted in the direction towards the optical transceivers including the tunable optical transmitters. The amplitude modulation is effected by using a dedicated WDM tone frequency as a carrier signal. The tuning information is included in this second WDM signal by modulating the WDM tone frequency. Of course, the WDM tone frequency is low as compared to the bitrate of the digital optical channel signals included within the second optical WDM signal and the modulation depth of the amplitude modulation is rather small so that the transmission of the digital optical channels signals is practically not influenced by the control channel realized by the amplitude modulation.

According to an embodiment of the invention, the central tuning device includes an optical modulator device adapted to amplitude-modulate the second optical WDM signal using a WDM tone frequency as a carrier frequency which is modulated according to the tuning control information, and the first optical transceivers are adapted to detect the tuning control information included in the WDM tone frequency amplitude modulation of the respective second optical channel signal which is also present within each second digital optical channel signal.

In a further alternative, the first optical transceivers apply an amplitude modulation of the respective first digital optical channel signal using a respective dedicated channel tone frequency as a carrier frequency, and the central tuning device is adapted to create a tuning status information with respect to one or more selected or all first digital optical channel signals by opto-electrically converting the optical WDM detection signal and/or an optical signal obtained from the optical WDM detection signal and narrow-band filtering the respective converted electrical signal with respect to the dedicated channel tone frequency. The tuning status information characterizes the current spectral position of the respective first digital optical channel signal with respect to a desired spectral position within the respective optical channel and/or whether or not a first digital optical channel signal is received within a predetermined optical channel.

The first optical transceivers can be adapted to modulate the respective channel tone frequency according to a signaling information to be transmitted to the central tuning device, and the central tuning device can be adapted to detect the signaling information which is included within the amplitude modulation of the first digital optical channel signals.

The signaling information may especially include identification information that is unique for each of the first optical transceivers and the central tuning device uses the identification information within the amplitude modulation of the second optical WDM signal for addressing the tuning control information to the respective first optical transceivers.

According to a further embodiment of the invention, the central tuning device may include a detection device including an opto-electrical detector adapted to detect the optical WDM detection signal. In this embodiment, no filter device serving as a wavelength locking device is needed if the multiplexer device for multiplexing the first digital optical channel signals or any other filter device used within the optical path of each of the first digital optical channel signals or within the path of the first optical WDM signal defines the optical channels (the spectral characteristics thereof) used in the first optical WDM signal which is detected by the central tuning device.

In another embodiment, the central tuning device may include a detection device including at least one optical filter device which receives the optical WDM detection signal as an input signal and which preferably has a periodic transfer function, and at least one opto-electrical detector adapted to opto-electrically detect the at least one optically filtered optical WDM detection signal that has passed through the at least one optical filter device. In this type of embodiment, the opto-electrically detected signal or a combination of two or more of the opto-electrically detected signals, especially a ratio of values of two signals, may be used as the tuning status information.

The central tuning device may include a control device which is adapted to determine, for one or more selected or all first digital optical channel signals, the tuning status information using one or more electrical output signals of the at least one opto-electrical detector of the detection dell vice, which is supplied to the control device, and to determine, for one or more selected or all first digital optical channel signals, a tuning control information using the tuning status information and, optionally, a tuning reference information, such as tuning target values stored in the control device.

According to a further embodiment, the central tuning device may include a channel presence detecting device adapted to detect the presence of first optical channel signals within the first optical WDM signal and to provide this information to the control device. The channel presence detecting device makes it possible to detect a situation when two or more first optical transceivers are simultaneously activated without being configured, even when the newly added or activated optical transceivers are configured using an amplitude modulation of the respective digital optical channel signal having the same initial tone frequency. The channel presence detecting device may be realized as optical spectrum analyzer. It is however, unnecessary, to exactly detect the full spectrum or absolute values of the WDM detection signal. It is sufficient to qualitatively detect the presence of newly added first digital optical channel signals in order to determine in which of the predefined optical channels of the first set of channels a selected (e.g. a newly added) first digital optical channel signal is received.

Each of the first optical transceivers may be adapted to control the respective tunable optical transmitter during a configuration mode such that it transmits the respective first optical channel signal within a first one of the channels of the set of first channels, if the first optical transceiver is re-activated or activated for the first time, the channel tone frequency of the amplitude modulation of the first optical cannel signal being set to a "NEW" frequency value. In this configuration mode, the respective first optical transceiver sweeps the first optical channel signal to a respective next channel of the set of first channels, as long as no message directed to the respective optical transceiver is detected in the tuning control information within a preset sweep interval. Of course, in this configuration mode, the first optical channel signal will not be able to correctly transport information via the respective transmission link. The optical channel signal may be created using an idle pattern instead of including information. The optical channel signal may even be a continuous optical signal merely including the amplitude modulation using the frequency tone at the "NEW" frequency value.

Having received a respective message, the respective first optical transceiver may stop sweeping the optical channels and maintain the transmitted first optical channel signal within the actual optical channel. Further, the respective first optical transceiver may switch the channel tone frequency to a dedicated channel tone frequency included in the tuning control information received. This tone frequency is then used for the communication from the respective first optical transceiver to the central tuning device. This rather simple configuration procedure is applicable whenever the second digital optical channel signal of the pair of channel signals for the upstream and downstream direction dedicated to the respective optical transceiver is present already at the beginning of the configuration process. Thus, this application is especially suitable for a so-called head-end/tail-end configuration, in which at the head end of an optical WDM transmission link (single-fiber or dual-fiber link) the transceivers are controlled locally so that the downstream digital optical channel signals (transmission direction from the head-end to the tail-end, i.e. from the central tuning device to the first optical transceivers comprising the tunable optical transmitters) of each pair of optical channels are present already at the time when the configuration process is started at a selected tail-end transceiver.

Of course, the first optical transceivers can be adapted to start the configuration only if a downstream optical channel signal assigned to the respective transceiver is detected when the configuration mode is started. If a transceiver detects the loss of the respective downstream optical channel signal, it may abort the configuration process and/or issue an error signal.

In another embodiment, concerning a so-called symmetric configuration, it cannot be assumed or guaranteed that the respective downstream optical channel signals are present at any time at which a configuration process might start for an optical transceiver at the respective other end of the transmission link. In this case, a lack of the respective downstream optical channel signal may occur if the respective transceiver with its tunable optical transmitter at the second end of the transmission link is not yet installed or activated or already about to be configured itself. In such applications, the optical transceiver, which is in the configuration mode, may continue to sweep the respective first digital optical channel signal through the optical channels even after having reached the "correct" optical channel (which is usually assigned to the respective output port of the optical transceiver through the filter means included within the optical path, e.g. the multiplexer device) as long as it does not receive a respective message from the central tuning device within the control information (i.e. a message included in the control information transported by the optical WDM detection signal and by the respective optical channel signal that is supplied to the first optical transceiver to be configured).

In this embodiment, the first optical transceivers can be adapted to control the respective tunable optical transmitter such that it determines the optical channel to be used from the information included in the tuning control information received and tunes the optical transmitter such that the first optical channel signal is transmitted within this optical channel and that it switches the channel tone frequency to a dedicated channel tone frequency included in the tuning control information received.

Each of the first optical transceivers may be adapted to determine the optical channel to be used from a time difference value included in the tuning control information received and the current time (and from the information in which manner the past sweeping process was carried out). This time difference value can determined by the central tuning device as the difference of the current time at which the respective information has been transmitted to the respective first optical receiver (by amplitude-modulating the respective downstream second optical WDM signal) and the time at which the respective new optical channel signal (created by the optical transceiver to be configured) has been detected by the central tuning device. Of course, instead of the time difference value, the two respective time values may be included in the tuning information. The information in which manner the past sweeping process was carried out can be stored by the respective optical transceiver, e.g. by storing the information at which time the optical transmitter was controlled to create the respective optical channel signal in which optical channel (i.e. at which optical center wavelength). This stored information may include the time values at which the switching of the center wavelength of the respective optical channel signal from a current channel to the next channel was effected, and the channel information of the current or next channel (e.g. a channel number or the center wavelength). For storing this information a table may be used.

Having received a tuning information addressed to it, the optical transceiver can determine, from the time difference value received and the current time (at which the time difference value was received), the time at which the central tuning device received the digital optical channel signal and thus, using the stored information concerning the past sweeping process, the correct channel that has been physically assigned to this optical transceiver.

The control device may be adapted to detect whether and in which optical channel a new first optical channel signal has been added to the optical WDM detection signal using the information provided by the channel presence detecting device, and, if so, to transmit to the respective first optical transceiver, as tuning information, the information concerning the respective dedicated channel tone frequency.

According to an embodiment of the invention, the control device may be adapted to transmit a "WAIT AND RESTART" information to all first optical transceivers if the control device detects, from information provided by the channel presence detecting device, the presence of two or more newly added first optical channel signals, and those two or more first optical transceivers, as a reaction to the receipt of a "WAIT AND RESTART" information, interrupt the sweeping process and restart the configuration process after a given time interval, preferably a random time interval.

BRIEF DESCRIPTION OF THE SEVERAL VIEWS OF THE DRAWINGS

In the following, the invention will be described with reference to the embodiments apparent from the drawing. In the drawing, the Figures show.

DETAILED DESCRIPTION OF EXEMPLARY EMBODIMENTS OF THE INVENTION

Figure 1:
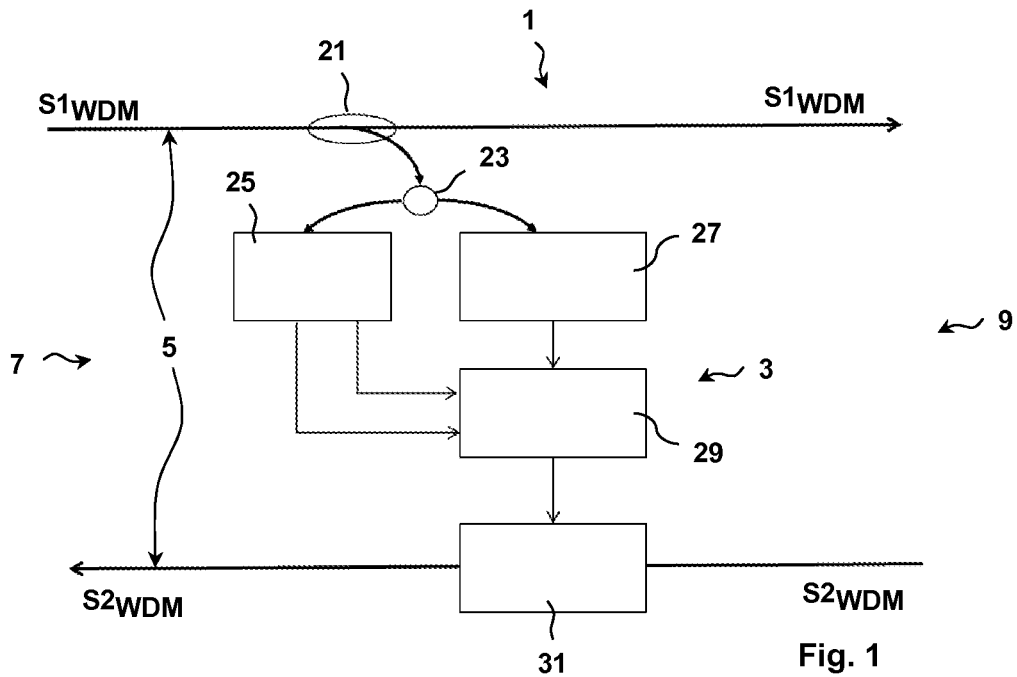
FIG. 1 a schematic block diagram of the portion of a fiber-optic WDM transmission system according to an embodiment of the invention including a central tuning device provided within the optical path of an dual-fiber WDM transmission link.
Figure 3:
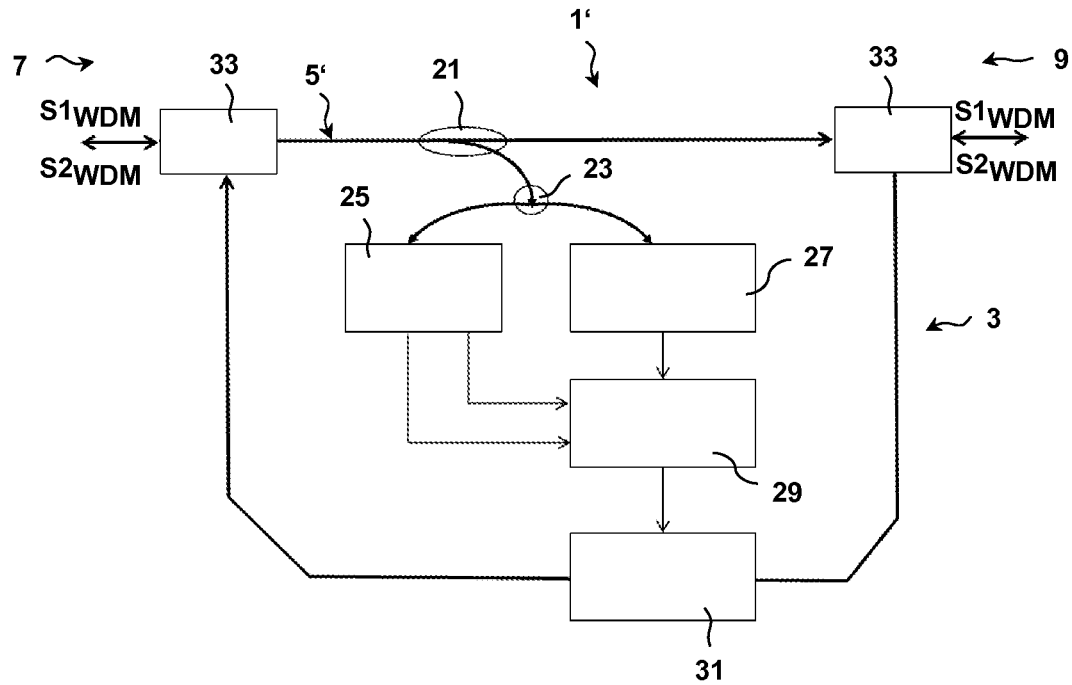
FIG. 3 a schematic block diagram of the portion of a fiber-optic WDM transmission system according to a further embodiment of the invention including a central tuning device provided within the optical path of an single-fiber transmission link.

FIG. 1 shows a schematic block diagram of a portion of a fiber-optic WDM transmission system 1 according to a first embodiment of the invention including a central tuning device 3 provided within the optical path of an optical WDM transmission link 5, which is formed as a dual-fiber WDM transmission link. A first end 7 of the optical WDM transmission link is connected to a given number n of optical transceivers 11 via a respective passive optical network (PON) (FIG. 3). A second end 9 of the optical WDM transmission link 5 is also connected to a number n of optical transceivers via a suitable PON. Thus, the WDM transmission system 1 is capable of providing a number of n point-to-point connections between a respective first optical transceiver 11 provided at the first end 7 and a respective second optical transceiver provided at the second end 9 of the WDM transmission link.

Figure 2:
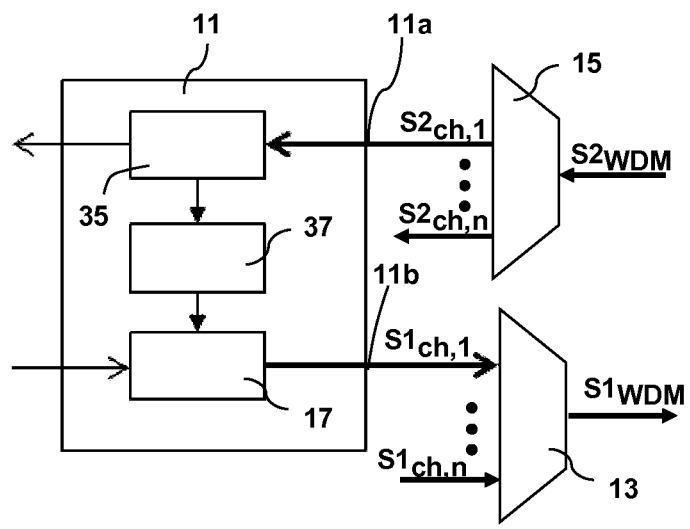
FIG. 2 a schematic block diagram of the western or eastern end portion of the fiber-optic WDM transmission system in FIG. 1 including a number of first optical transceivers including tunable optical transmitters and a passive optical connection network for connecting the optical transceivers to the respective end of the transmission link.

Each of the optical transceivers 11 coupled to the first or western end 7 of the optical WDM transmission link 5 creates a first digital optical channel signal $S1_{ch,i}$ at a specified optical center wavelength so that each of the first digital optical channel signals $S1_{ch,i}$ can be transmitted within a dedicated optical channel of a first set of optical channels defined for the optical WDM transmission system 1. Likewise, each of the second optical transceivers connected to the second or eastern end 9 of the optical WDM transmission link 5 is adapted to create a second digital optical channel signal $S2_{ch,i}$ at a given center wavelength so that each of these second digital optical channel signals $S2_{ch,i}$ can be transmitted within a dedicated optical channel of a second set of optical channels defined for the WDM transmission system 1. Of course, in a dual-fiber WDM transmission link as shown in FIGS. 1 and 2, the first and second set of optical channels may not only use the same optical band or overlapping optical bands, but the center wavelengths or the optical spectrum of the single optical channels of the first and second set of optical channels may even be identical or overlap. Each of the point-to-point transmission links uses a dedicated pair of optical channels and optical channel signals $S1_{ch,i}$, $S2_{ch,i}$ (wherein i=1 ... n and i, n are integer values).

Further, each of the first optical receivers 11 at the first end 7 of the WDM transmission link 5 is adapted to receive a selected second digital optical channel signal $S2_{ch,i}$ and each of the second transceivers 11 is adapted to receive a selected one of the first digital optical channel signals $S1_{ch,i}$ in order to establish a bidirectional communication between a selected transceiver 11 at the western end 7 and a selected transceiver at the eastern end 9 of the WDM transmission link 5.

According to certain embodiments, the PON and the optical transceivers provided at the second end 9 of the WDM transmission link 5 are designed and controlled such that the second optical channel signals $S2_{ch,i}$ are present at any time at which one or more of the transceivers 11 at the first end 7 of the WDM transmission link 5 are to be configured or to be fine-tuned. In the following, such a configuration will be addressed as head-end/tail-end configuration, the head end being provided at the second or eastern end 9 and the tail end being provided at the first or western end 7 of the WDM transmission link 5.

In other embodiments, the second optical transceivers at the second end 9 of the WDM transmission link are designed and controlled such that the second optical channel signals $S2_{ch,i}$ may not be present at all times at which one or more of the transceivers 11 at the first end 7 of the WDM transmission link 5 are to be configured or to be fine-tuned. This is especially the case if the second transceivers are designed (with respect to their function) identically with the first transceivers 11 as shown in FIG. 2, i.e. if also the second transceivers are configurable with respect to the channel used for the second optical channel signals $S2_{ch,i}$. This type of configuration will be addressed as symmetric configuration throughout the following description. It shall be noted that for configuring the second transceivers 11 at the second end in such a symmetric configuration, a second tuning device may be used which can be designed and which can operate in an analogous manner as will be described below with respect to the central tuning device 3 and the first transceivers at the first end 7 of the WDM transmission link. Of course, the same applies to the embodiment according to FIGS. 3 and 4 using a single-fiber WDM transmission link 5'.

As explained above, FIG. 2 shows the western end portion of the WDM transmission system 1 shown in FIG. 1 including a given number n of first optical transceivers 11 having an input port 11a for receiving a dedicated second digital optical channel signal $S2_{ch,i}$ and an output port 11b for transmitting a first digital optical channel signal $S1_{ch,i}$. The first channel signals $S1_{ch,i}$ are multiplexed by an optical multiplexer or multiplexing means 13 which receives the digital optical channel signals $S1_{ch,i}$ at respective multiplexing or input ports and outputs a first WDM optical channel signal $S1_{ch,i}$ including the channel signals $S1_{ch,i}$ created by all transceivers 11 which are present and activated. A demultiplexer or demultiplexing means 15 receives a second WDM transmission signal $S2_{WDM}$ including all optical channel signals $S2_{ch,i}$ which are created at the second or eastern end portion of the WDM transmission system 1 according to FIG. 1. As already mentioned, in the configuration shown in FIG. 2, the multiplexer 13 and the demultiplexer 15 form the optical PON for connecting the n first optical transceivers 11 to the first or western end 7 of the WDM transmission link 5 as shown in FIG. 1.

For the further description, the exact physical configuration of the PON that is used at the first or second end 7, 9 of the WDM transmission system 1 is of secondary importance, only. The transceivers 11 may be provided at a central location or may be distributed in order to connect distributed locations to the WDM transmission link 5. Especially in a distributed configuration of the optical transceivers 11 at either the western or eastern end or at both ends of the WDM transmission link 5, it is desirable to have a central tuning device 3 which is capable of controlling the transceivers 11 in order to simplify the transceivers and thus reduce cost. However, a central tuning device 3 may also be used if the transceivers 11 are provided at the same location. Each transceiver 11 is tuned with respect to the center wavelength of the digital channel signals $S1_{ch,i}$ created.

In a coarse or channel tuning process the center wavelength of the channel signal $S1_{ch,i}$ is tuned such that the channel signal $S1_{ch,i}$ lies within the optical channel physically assigned to the respective transceiver 11, e.g. by the multiplexer 13. The coarse tuning may be effected by sweeping the center wavelengths using predetermined discrete values of a control signal, each discrete value being assigned to a predetermined optical channel. Of course, it must be assured that the channel signal $S1_{ch,i}$ created due to a given discrete value of the control signal lies with sufficient accuracy within the dedicated optical channel, so that the respective signal is detectable by the central tuning device 3. In this way, it is possible to rather quickly sweep the center wavelength of the channel signal $S1_{ch,i}$ through the whole band of the first set of optical channels by using the given discrete values of the control signal, only, instead of continuously sweeping the center wavelength through the whole optical band.

In a fine tuning process, which is carried out continuously, in given time intervals or on request whenever a transceiver 11 has been activated and coarsely tuned, the center wavelength of the channel signal $S1_{ch,i}$ is optimized so that it corresponds with the center wavelength of the respective dedicated optical channel.

In the following, the terms "tuning", "tuning information" and the like relate to both of the aforementioned coarse and fine tuning processes unless reference is explicitly made to a coarse or fine tuning process.

As apparent from FIG. 2, each of the optical transceivers 11 which are provided at the western end 7 of the transmission link 5 includes a tunable optical transmitter 17. The transmitter 17 can be tuned over the whole spectrum of the first set of optical channels. For the sake of simplicity, only a single optical transceiver 11 (the first one of n transceivers 11 transmitting and receiving the pair of channel signals $S1_{ch,i}$ and $S2_{ch,i}$) is shown in FIG. 2.

The central tuning device 3 according to FIG. 1 includes an optical splitter 21 for tapping off an optical WDM detection signal $S_{det,WDM}$ from the WDM signal $S1_{WDM}$. The optical splitter 21 may simply be realized as an optical power splitter tapping off a rather small portion of the optical power of the WDM signal $S1_{WDM}$.

According to FIG. 1, the central tuning device 3 includes a further optical splitter 23 for splitting the WDM detection signal $S_{det,WDM}$, wherein a first splitting port of the splitter 23 is connected to a detection device 25 and a second splitting port of the splitter 23 is connected to a channel presence detecting device 27.

The channel presence detecting device 27 has, in general, the ability to detect digital optical channel signals $S1_{ch,i}$ which are newly added to the first WDM transmission signal $S1_{WDM}$ and the WDM detection signal $S_{det,WD}$, Respectively, and in which Optical Channel of the First Set of optical channels a selected (especially a newly added) digital optical channel signal $S1_{ch,I}$ is received. For this purpose, of course, a means having the abilities of a full optical spectrum analyzer could be used. However, as a qualitative detection is required, only, a simplified device is sufficient, just being capable to detect the presence of an optical channel signal within an optical channel so that an assignment of the signal (especially a newly detected signal) to the correct optical channel can be made.

The detection device 25 includes at least one opto-electrical detector, such as a photodiode, for detecting the optical WDM detection signal $S_{det,WDM}$. The detection device 25 may further include at least one optical filter device which receives the optical WDM detection signal $S_{det,WDM}$ as an input signal and which preferably has a periodic transfer function. Instead of the at least one opto-electrical detector for directly detecting the WDM detection signal $S_{det,WDM}$ or in addition thereto, at least one further opto-electrical detector may be provided for detecting the at least one optically filtered WDM detection signal that has passed through the at least one optical filter device (the WDM detection signal may be split and provided to the respective input port of each of the optical filters).

The opto-electrically converted signals are supplied to a control device 29 adapted to receive and process the opto-electrically converted signals received from the detection device 25 and to receive and process an output signal from the channel presence detecting device 27.

The control device 29 processes the opto-electrically converted signals supplied from the detection device 25 and the information included in the signal supplied from the channel presence detecting device 27 to determine the tuning status information. This tuning status information may especially include information as to whether a new optical channel signal $S1_{ch,i}$ has been added to the WDM signal $S1_{WDM}$, in which optical channel of the first set of optical channels the newly added channel signal has been received, and information concerning the fine tuning status of the digital optical channel signals included in the WDM signal $S1_{WDM}$, i.e. information that can be used by the control device 29 to control the tunable optical transmitters 17 of the optical transceivers 11 such that the respective digital optical channel signals $S1_{ch,i}$ are optimally positioned within the bandwidth of the respective optical channel.

An advantageous method for detecting fine tuning information and fine-tuning the optical transceivers is described in the non-prepublished European patent application no. 11 401 589.4, filed on Sep. 12, 2011, "An optical frequency locking method and device for optical data transmission" of the applicant. The disclosure of this prior application is herewith fully incorporated by reference.

As explained in this prior European patent application, each optical transceiver 11 is adapted to impress an amplitude modulation using a dedicated, rather low frequency as a further information carrier signal onto the respective digital optical channel signal $S1_{ch,i}$. The respective carrier frequency is assigned to each of the optical transceivers 11 by the central tuning device 3 and is unique for each of the digital optical channel signals $S1_{ch,i}$ so that the information included in this control channel transported by each digital channel signal $S1_{ch,i}$ can be detected at the central tuning device 3 by electrically (narrow) band-pass filtering an electrical signal which is obtained by opto-electrically converting the WDM detection signal $S_{det,WDM}$ or an optically filtered signal that has been obtained from the WDM detection signal. In this way, the control device 29 is capable of detecting any information included in the control channel using the amplitude modulation at a channel-specific carrier frequency. This additional control channel included in each digital optical channel signal $S1_{ch,i}$ may include, on the one hand, digital information, for example identification information like an ID number, and, on the other hand, the analog information included in the average power of the signal included in the amplitude modulation. While the analog information can be used to detect and optimize the center wavelength of the respective digital optical channel signal $S1_{ch,i}$ with respect to the dedicated optical channel, the digital information is especially useful during the configuration or coarse tuning process which is carried out if an optical transceiver 11 has been newly added and activated for the first time or if an optical transceiver 11 has been switched off and is again reactivated.

The control device 29 is adapted to carry out the process for configuring a newly added and activated or reactivated optical transceiver as well as to perform the fine tuning of the tunable optical transmitters 17 included within the optical transceivers 11. The fine tuning can be effected continuously or periodically or on request.

In any case, the control device 29 determines tuning control information using the signals supplied and, if applicable, information stored in the control device 29. The control device 29 outputs a modulation signal $S_{mod}$ including the tuning control information and supplies the modulation signal $S_{mod}$ to an optical modulator device 31 of the central tuning device 3. The optical modulator device 31 is provided in the downstream path of the second optical WDM signal $S2_{WDM}$ transmitted from the second end 9 to the first end 7 of the optical WDM transmission link 5. The optical modulator device 31 modulates the second optical WDM signal $S2_{WDM}$ (with respect to its optical power) according to the modulation signal $S_{mod}$ using an amplitude modulation. For this amplitude modulation, as in the case of the amplitude modulation of the optical channel signals $S1_{ch,i}$, a rather low carrier frequency (as compared to the bitrate of the digital optical channel signal $S1_{ch,i}$, $S2_{ch,i}$) is used. This carrier frequency has a characteristic frequency which in the following is designated as WDM tone frequency $f_{tone,WDM}$.

As the optical power of the second WDM signal $S2_{WDM}$ is modulated, this amplitude modulation is impressed on each of the second optical channel signals $S2_{ch,i}$ in the same manner. A simple way to effect this amplitude modulation is the use of a variable optical attenuator (VOA) as an optical modulator device 31, the optical attenuation being dependent on the modulation signal $S_{mod}$. Thus, a downstream control channel is realized for each of the second digital optical channel signals $S2_{ch,i}$ included in the second optical WDM signal $S2_{WDM}$. The tuning control information determined by the control device 29 for one or more selected or all of the transceivers 11 can be transmitted to the respective transceiver 11 by creating the modulation signal $S_{mod}$ such that a carrier signal at the WDM tone frequency $f_{tone,WDM}$ is digitally modulated according to the tuning control information.

The digital (tuning control) information may include identification information for addressing a selected transceiver 11 and the actual tuning information. The actual tuning information may include information concerning the carrier frequency for amplitude-modulating the respective first digital optical channel signal $S1_{ch,i}$ (i.e. concerning the channel tone frequency $f_{ch,i}$ to be used by the respective transceiver 11), a channel number, time information or time difference information, and information for fine-tuning the center frequency of the respective digital optical channel signal.

As apparent from FIG. 2, each of the optical receivers 11 receives the demultiplexed optical channel signal $S2_{ch,i}$ at an input port of an optical receiver 35. The optical receiver 35 processes the channel signal $S2_{ch,i}$ received and outputs a respective digital electrical channel signal for further processing. The optical receiver 35 is further adapted to detect the tuning information included in the amplitude modulation of the optical channel signal $S2_{ch,i}$ and supplies this information to a controller unit 37. The information included in the downstream control channel realized by the amplitude modulation of the second channel signals $S2_{ch,i}$ is examined by the control unit 37 as to whether all or part of the information is addressed to the respective transceiver 11. If so, the controller unit 37 extracts the information addressed to the respective transceiver 11 and uses this information for tuning the center wavelength of the optical transmitter 17 and for additionally controlling the optical transmitter 17 such that an optical channel signal $S1_{ch,i}$ is created including an amplitude modulation at a desired channel tone frequency $f_{ch,i}$. As explained above, this amplitude modulation realizing an upstream control channel within each of the optical digital channel signals $S1_{ch,i}$ may be created such that, in addition to the use of a characteristic dedicated channel tone frequency $f_{ch,i}$, digital information can be transmitted to the central tuning device 3.

Figure 4:
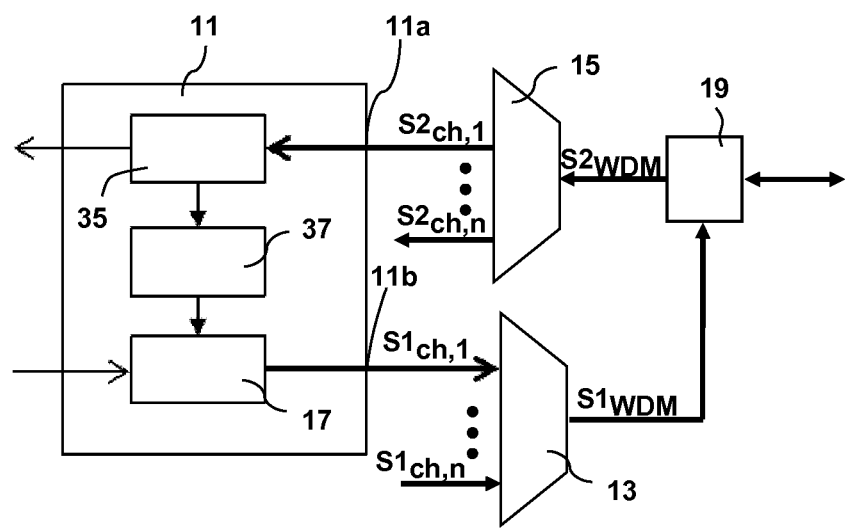
FIG. 4 a schematic block diagram of the western or eastern end portion of the fiber-optic WDM transmission system in FIG. 3 including a number of first optical transceivers including tunable optical transmitters and a passive optical connection network for connecting the optical transceivers to the respective end of the transmission link.

A further embodiment of an optical WDM transmission system 1' is shown in FIGS. 3 and 4. This embodiment differs from the embodiment shown in FIGS. 1 and 2 only in that a single-fiber optical WDM transmission link 5' is used instead of a dual-fiber optical WDM transmission link 5. Thus, for the following description, components or features identical to the embodiment shown in FIGS. 1 and 2 are referred to using identical reference signs.

As shown in FIG. 3, in case of a single-fiber WDM transmission link 5', the central tuning device 3' as compared to the central tuning device 3 in FIG. 1 further includes a first and second means 33 for optically combining/separating the optical paths of the first and second WDM signal $S1_{WDM}$ and $S2_{WDM}$, respectively. The means 33 for optically combining/separating the optical paths of the WDM signals $S1_{WDM}$, $S2_{WDM}$ are provided to the left and right of the optical splitter 21. The optical modulator device 31 is provided within the optical signal path guiding the optical WDM signal $S2_{WDM}$ between an output port of the means 33 provided downstream (with respect to the transmission direction of the signal $S1_{WDM}$) of the optical splitter 21 and an input port of the means 33 provided upstream of the optical splitter 21. The means 33 may be realized as optical circulators or optical diplexers. Of course, optical diplexers are only applicable if the first and second sets of optical channels do not use identical or overlapping optical bands. The means 33 provided upstream of the optical splitter 21 is adapted to receive the optical WDM signal $S1_{WDM}$ at a common first port and transmits this signal to a second port that is connected to the optical splitter 21 and a second port of the means 33 provided downstream of the splitter 21. Further, the means 33 provided upstream of the splitter 21 is adapted to receive the second (modulated) WDM signal $S2_{WDM}$ from the optical modulator 31 at a third port and to transmit this signal at the common first port. Likewise, the means 33 provided downstream of the optical splitter 21 is adapted to receive the optical WDM signal $S2_{WDM}$ at a common first port and transmits this signal to a third port that is connected to the optical modulator 31. Further, the means 33 provided downstream of the splitter 21 is adapted to receive the first WDM signal $S1_{WDM}$ at the second port that is connected to the optical splitter and to transmit this signal at the common first port.

As apparent from FIG. 4, the PON for connecting the optical transceivers 11 to the first (or first and second) end of the optical WDM transmission link 5' includes means 19 for optically combining/separating the optical paths of the optical WDM signals $S1_{WDM}$ and $S2_{WDM}$ which are transmitted to and received from the second end 7 of the single-fiber WDM transmission link 5'. As combining/separating means 19, an optical circulator may be used which is adapted to output the WDM signal $S2_{WDM}$ received from the first end of the WDM transmission link 5' in direction to the input port of the demultiplexer 15 and to output the WDM signal $S1_{WDM}$ received from the output port of the multiplexer 17 to the first end of the WDM transmission link 5'. Of course, if separate optical bands for the first and second sets of optical channels are used, an optical diplexer may be used instead of an optical circulator.

Apart from these differences, the central tuning device 3' shown in FIG. 3 and the transceivers 11 shown in FIG. 4 are practically identical with the central tuning device 3 in the dual-fiber embodiment, so reference can be made to the above description, especially with respect to the functional features and the method realized by the central tuning device 3' and the transceivers 11.

In the following, the configuration, i.e. the coarse tuning, and the fine tuning of the optical transceivers 11 will be described referring to embodiments including a central tuning device 3, 3' as shown in FIGS. 1 and 3 which is adapted to centrally (and also remotely) control the configuration, i.e.

the coarse tuning, and fine tuning of the optical transceivers 11 connected to the first end 7 of the optical WDM transmission link 5.

First, the coarse tuning of a newly added or reactivated optical transceiver will be described assuming a head-end/tail-end configuration, the tail end being the portion at the first or western end 7 and the head end being the portion at the second or eastern end 9 of the optical WDM transmission system 1, 1' according to FIGS. 1, 2 and FIGS. 3, 4, respectively. As mentioned above, in such a head-end/tail-end configuration it is generally assumed that the second optical channel signals $S2_{ch,i}$ are present—apart from a failure situation—at any time at which a first transceiver at the tail end is to be configured.

Figure 5:
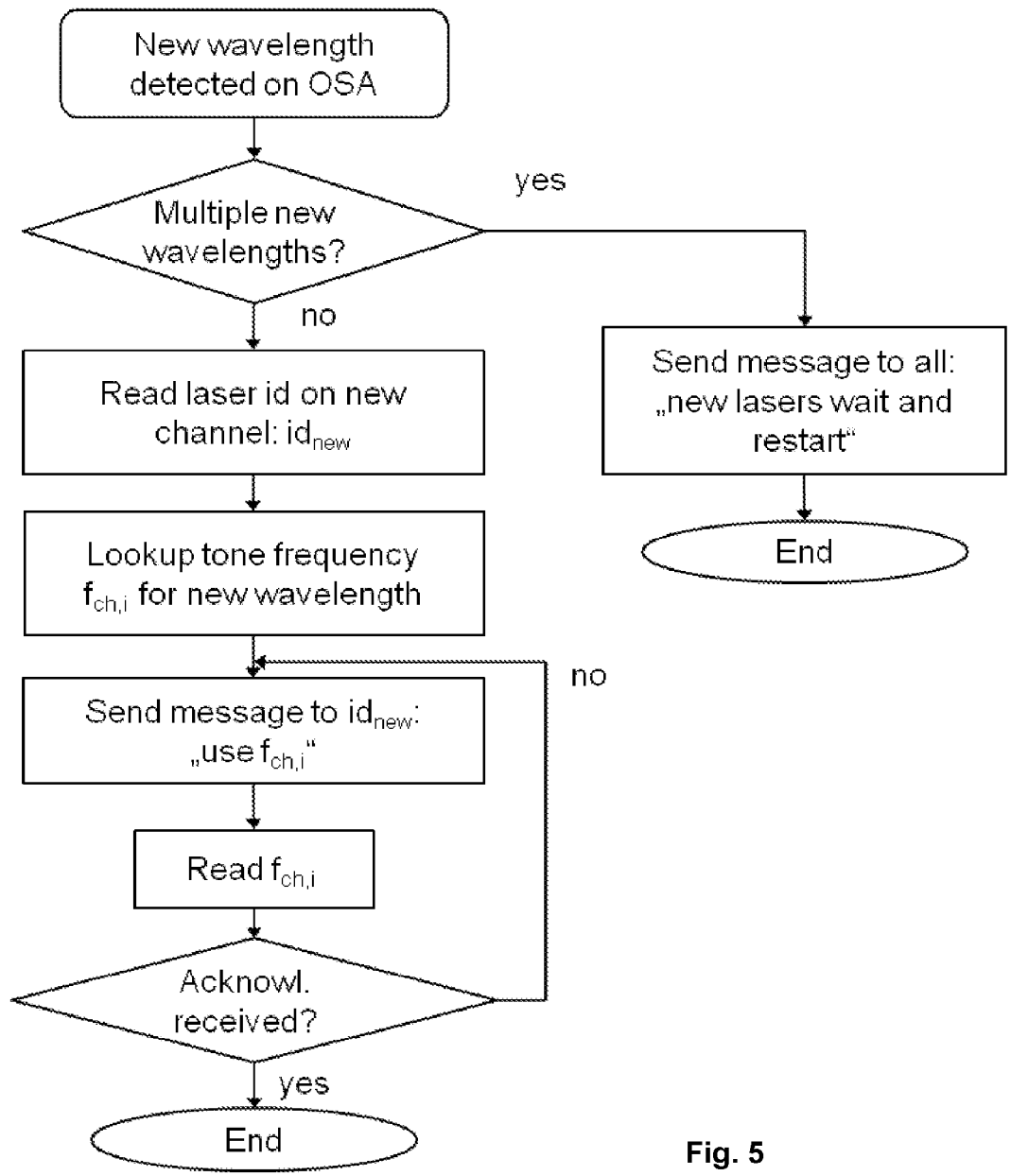
FIG. 5 a schematic flow diagram of the configuration method applied by the central tuning device in a head-end/tail-end configuration of the WDM transmission system.

FIG. 5 shows a simplified flow diagram describing the part of a simple configuration process that is carried out at the central tuning device 3, 3' which acts as a master.

The process starts by (continuously or periodically) detecting whether a new first digital optical channel signal $S1_{ch,i}$ has been added to the WDM detection signal $S_{det,WDM}$. This information is delivered by the optical channel presence device 27 that supplies a respective signal to the control device 29 (referred to as OSA in FIGS. 5 and 7a). For reasons of simplicity, the digital optical channel signals $S1_{ch,i}$ are referred to as "new wavelength" in the flow diagrams of FIGS. 5 to 9. If a new channel signal has been detected, the control device checks whether more than one new channel signal is detected, as this would lead to a failure situation due to the simplified detection of the optical channel signals $S1_{ch,i}$ in the detection device 25. If two or more newly added (and thus not configured) optical channel signals are detected, the control device sends, using the downstream control channel realized by the amplitude modulation of the second channel signals $S2_{ch,i}$, a "new lasers wait and restart" message to all optical transceivers 11 (the optical transmitters 17 of the optical transceivers 11 are referred to as "lasers" in the flow diagrams according to FIGS. 5 to 9). Sending this message to all transceivers 11 is required as the unconfigured transceivers cannot yet be addressed correctly.

If a single new optical channel signal $S1_{ch,i}$ is detected, the control device 29 reads the information of the respective control channel included within the newly detected optical channel signal $S1_{ch,i}$ which is obtained by electrically narrow band-filtering a selected electrical signal supplied by the detection device 25 including the information of all control channels included within the first digital optical channel signals $S1_{ch,i}$ (see above).

As a newly added or unconfigured transceiver 11 uses a unique channel tone frequency having a value $f_{new}$ as carrier frequency for the control channel in the first channel signal $S1_{ch,i}$ the control unit applies a narrow band-filtering with a respectively adjusted band filter so that the information included in the control channel of the single new optical channel signal $S1_{ch,i}$ is detected.

The control unit then reads the ID information $id_{new}$ of the "new" transceiver (or the respective optical transmitter 17 included in the transceiver 11) and reads the dedicated channel tone frequency $f_{ch,i}$ from a table stored in the control unit 29 including the assignment of unique channel tone frequencies $f_{ch,i}$ to the predefined channels of the first set of optical channels. For this selection, the channel information included in the signal supplied from the channel presence device 27 is used. The information concerning the dedicated selected channel tone frequency $f_{ch,i}$ is transmitted to the respective transceiver 11 through the downstream control channel that is received by all transceivers 11. The respective transceiver which has first sent the optical channel signal including the control channel at the $f_{new}$ channel tone frequency is addressed using the $id_{new}$ as ID information.

In a next step, the control device 29 monitors the control channel using the channel tone frequency $f_{ch,i}$ that has been sent to the "new" transceiver (i.e. the transceiver to be currently configured) until an "acknowledgement" message is received. As long as the control unit 29 does not receive the "acknowledgement" message, it repeats to send the channel tone frequency information $f_{ch,i}$ to the "new" transceiver. If the "acknowledgement" message is received, the configuration process at the master is finished.

Figure 6:
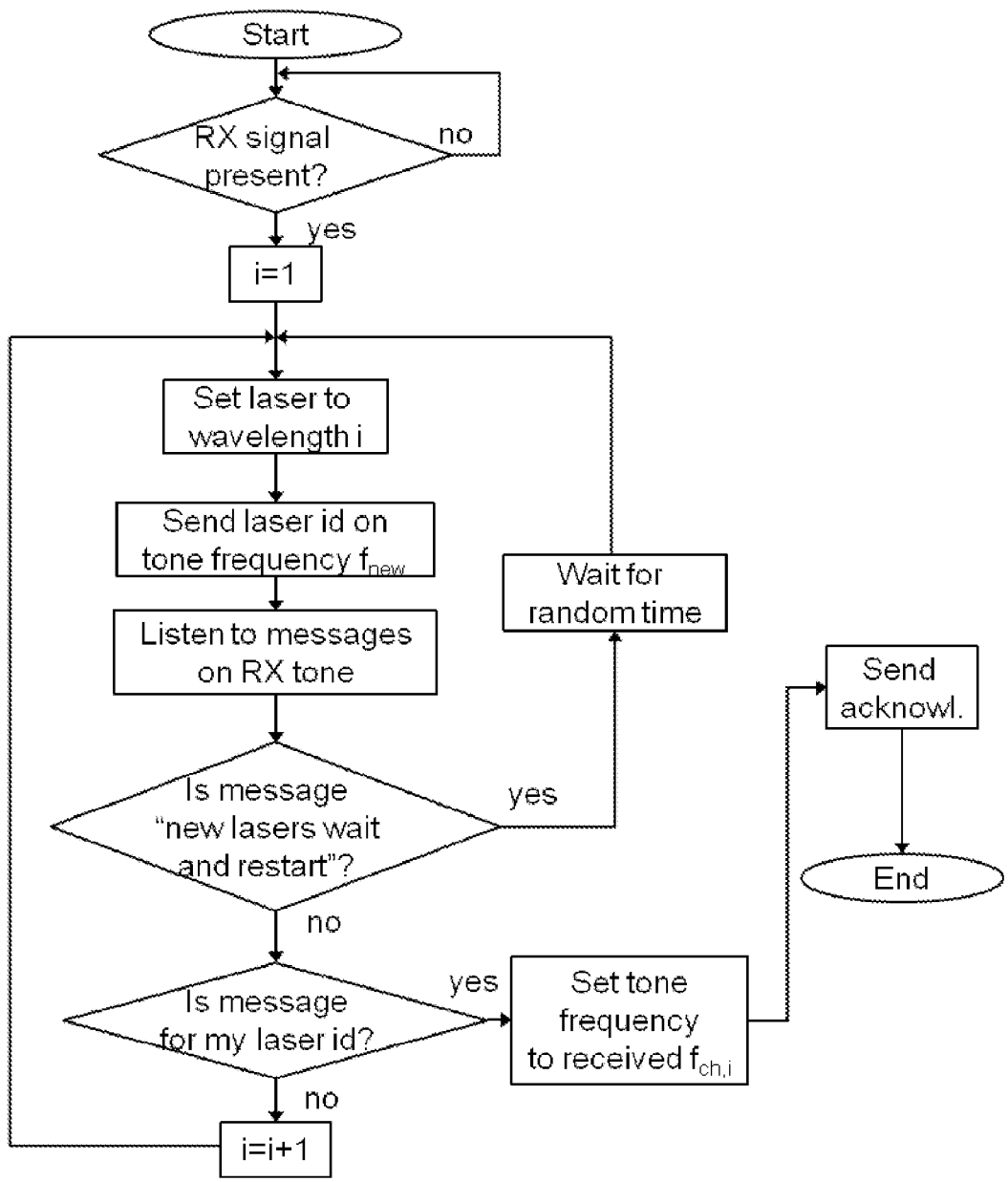
FIG. 6 a schematic flow diagram of the configuration method applied by the optical transceiver to be configured in connection with the flow diagram in FIG. 4.

FIG. 6 shows the flow diagram of the related process that is carried out at each transceiver 11 to be configured.

The process starts with a detection of an "RX" signal, i.e. the respective second digital optical channel signal $S2_{ch,i}$ assigned to and received by the selected transceiver. As long as this signal is not received (e.g. due to a failure situation at the second or head end of the transmission system 1, 1'), the step of detecting the presence of the channel signal $S2_{ch,i}$ is carried out. If the signal is present, the control unit 37 of the transceiver 11 sets a counter to i=1 and starts with a loop in which the wavelength of the first digital optical channel signal $S1_{ch,i}$ is swept through the optical channels of the first set of optical channels. In this loop, the control unit 35 first controls the optical transmitter 17 to transmit the first optical channel signal at an optical wavelength corresponding to a first optical channel of the first set of optical channels. Additionally, the control unit 37 controls the transmitter 17 to use the unique value $f_{new}$ for the channel tone frequency and to transmit, within this control channel, the ID information of this transceiver 11 or transmitter 17.

Then the control unit detects the signal of the control channel included within the respective second optical channel signal $S2_{ch,i}$ (the control channel is referred to as RX tone in FIG. 6) received (using the WDM tone frequency $f_{tone,WDM}$) as to whether a message "new lasers wait and restart" is received (this message is received if an additional transceiver starts the configuration process at essentially the same time; see above). If so, the control unit 37 waits for a random time interval and repeats the steps of controlling the wavelength and sending the ID information on the control channel at the frequency $f_{new}$. Otherwise, the control unit checks the signal of the downstream control channel at $f_{tone,WDM}$ as to whether a message for the respective transceiver 11 is received, i.e. digital information in the downstream control channel is addressed to the respective transceiver 11. If no such information is received within a predetermined time interval, the control unit 37 increases the counter by one (i=i+1) and repeats the steps of controlling the wavelength and sending the ID information on the control channel at the frequency $f_{new}$. Thus, in this next run through the loop the optical transmitter is controlled to send the first optical channel signal such that it corresponds to a next optical channel.

This loop is run through, at the maximum, until all optical channels of the first set of optical channels have been used for transmitting the first digital optical channel signal $S1_{ch,i}$. If no response from the central tuning device 3, 3' is received after having sent in the last optical channel, the control unit 37 may either start a new sweeping process or create an error signal. For reasons of simplicity, this behavior of the configuration process at the slave, i.e. the respective transceiver 11 to be configured, is not shown in FIG. 6.

If the control unit 37 detects a message addressed to the transceiver 11, which includes the dedicated channel tone frequency $f_{ch,i}$ it sets the carrier frequency of the control channel of the first channel signal to this value and transmits an "acknowledgement" message on the control channel. Having done so, the control unit 37 finishes the configuration process.

FIGS. 7A-C and 8 show configuration processes that are suitable to be carried out at the master and slave, respectively, in case of a symmetrical configuration. In such configurations, the processes must be capable of coping with a situation in which the respective downstream channel for a transceiver 11 to be configured is not present right at the beginning of the configuration process as the dedicated transceiver (of the point-to-point communication link) at the second end 9 is configured at essentially the same time).

The following description merely takes into account a configuration of the transmitters 11 at the first or western end 7 of the WDM transmission link 5, 5'. However, the transmitters at the second or eastern end 9 may, of course, also be configured in the same way by means of a central tuning device that is adapted to receive the second WDM signal $S2_{WDM}$ from the second end 9 and to transmit information on a WDM control channel included in the first optical WDM signal $S1_{WDM}$. A respective central tuning device may, of course, be designed to be practically identical with the central tuning devices 3, 3' shown in FIGS. 1 and 3, respectively. However, the optical modulator of the respective central tuning device must be provided within the optical path of the optical WDM signal $S1_{WDM}$ that is transmitted in the direction to the second end 9.

Figure 7A:
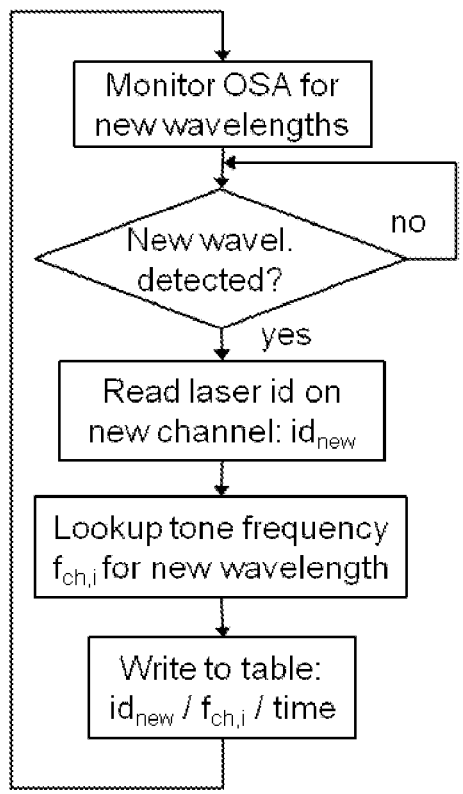
FIG. 7A a flow diagram of a first process of the configuration method applied by the central tuning device in a symmetric configuration of the WDM transmission system.
Figure 7B:
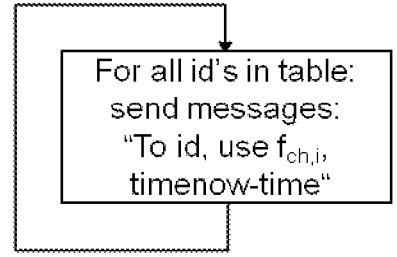
FIG. 7B a flow diagram of a second process of the configuration method applied by the central tuning device in a symmetric configuration of the WDM transmission system.
Figure 7C:
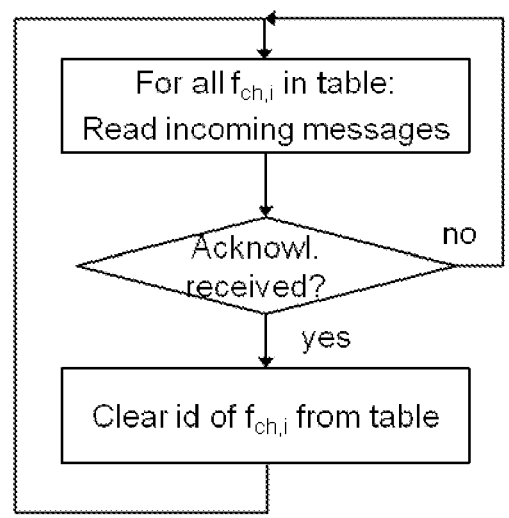
FIG. 7C a flow diagram of a third process of the configuration method applied by the central tuning device in a symmetric configuration of the WDM transmission system.

FIG. 7A-C show, as an example, the different processes which could be carried out by the control device 29 of the central tuning device 3, 3' in FIGS. 1 and 3, respectively, in order to configure a newly added or reactivated transceiver 11 at the first end 7 of the WDM transmission link 5, 5'.

As shown in FIG. 7A, in a first process the control 29 monitors the appearance of a new wavelength, i.e. a new optical channels signal $S1_{ch,i}$ included in the WDM signal $S1_{WDM}$ and the WDM detection signal $S_{det,WDM}$ split off therefrom using the signal or information supplied by the channel presence device 27. This monitoring is carried out until a new wavelength is detected.

If a new channel signal is detected, the control device 29 reads the ID information transmitted by the newly added or reactivated transceiver 11 (or the respective optical transmitter 17) and assigns a dedicated unique channel tone frequency $f_{ch,i}$ to this new transceiver 11. As already mentioned, the assignment rule may be included in a table stored in the control device 29. In a next step, the control unit 29 writes the ID information, the channel tone frequency $f_{ch,i}$ assigned and a value according to the time at which the ID information of the new optical channel signal $S1_{ch,i}$ has been read (on the signal control channel using the channel tone frequency $f_{new}$) to a current configuration table.

Of course, it might accidentally happen that two or more newly added or reactivated transmitters 11 almost simultaneously start to transmit respective channel signals at the correct optical wavelength (i.e. the center wavelength of the optical channel defined by the optical path to which the respective transceiver has been connected). As all of these transceivers 11 use the channel tone frequency $f_{ndw}$ the control device 29 cannot decide which ID information has been transmitted by which of the two or more newly added or reactivated transceivers. It might even happen that two messages in two or more signal control channels, which all use the channel tone frequency $f_{new}$, arrive almost simultaneously at the central tuning device 3, 3' so that the signals interfere and the ID information of the respective transmitters 11 cannot be detected correctly.

However, as the process shown in FIG. 7A is run continuously (or at least as long as a new channel signal $S1_{ch,i}$ is likely to be detected or until all channels defined for the respective WDM transmission system 1, 1' are used) and the loop time of the process is rather low, the above-explained problematic situations are rather unlikely to occur. Nevertheless, it is within the ordinary skill of an expert to take suitable measures to either avoid these problematic situations or to take suitable measures to solve such problematic situations, e.g. by detecting the situation and add additional steps to the process in FIG. 7A, like an additional step in which a message is sent to all transmitters causing the newly added transceivers to stop and restart the configuration process (see FIG. 8) at a random time interval. Alternatively, this problem (of not correctly detecting the respective signal and the ID information) may be ignored as the tunable optical transmitters can be controlled to continue with the sweeping process so that the channel signals may be correctly detected during the next or one of the following sweeps.

According to a further process shown in FIG. 7B, the control device 29 continuously transmits the information included in the current configuration table to the respective optical transmitters 11, wherein in addition the current time information "timenow" is added. Instead of a transmission of a separate "timenow" value, a time difference "timenow-time" may be sent to the respective transmitter 11 on the downstream control channel.

The transceiver 11, which receives such a configuration message, controls the transmitter 17 such that the respective digital optical channel signal is created at the correct optical wavelength and that the optical channel signal includes a control channel at the dedicated channel tone frequency $f_{ch,i}$ (see the description below). Additionally, the transceiver 11 transmits an acknowledgement message that is read by the control device 29 of the central tuning device 3, 3' by a further process as shown in FIG. 7C. As apparent from FIG. 7C, the control device 29 continuously reads the incoming messages on all control channels included in the optical channel signals $S1_{ch,i}$. If an acknowledgement message is received on a selected control channel using a channel tone frequency $f_{ch,i}$ the control device clears the respective ID from the current configuration table. The configuration process for the transceiver having this ID is then finished.

Of course, all loop processes shown in FIGS. 7A, 7B and 7C are run continuously by the control device 29 (if applicable, using a given delay time within the respective loop). The loops according to FIGS. 7B and 7C are run at least as long as the current configuration table includes information for given ID information.

Figure 8:
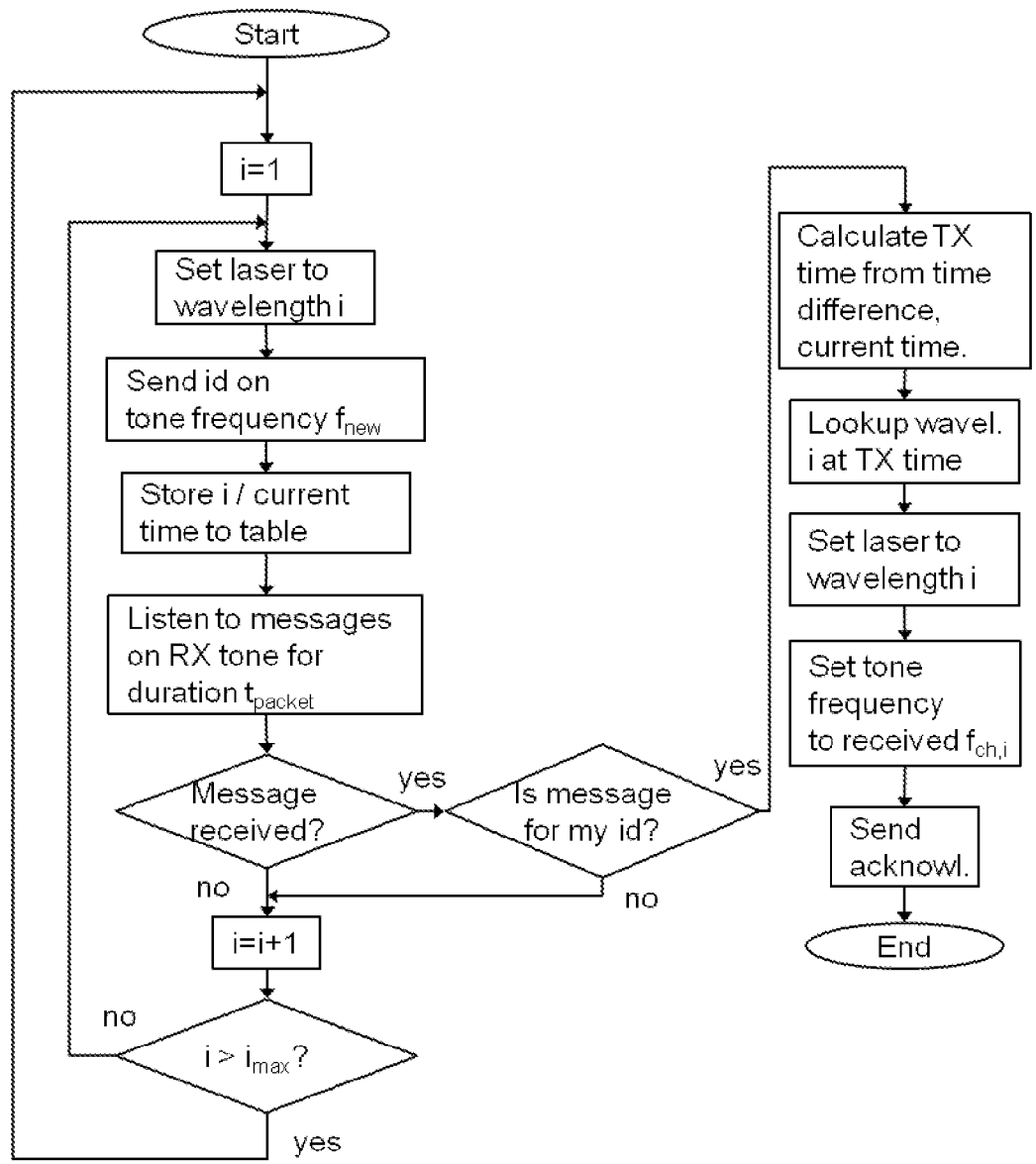
FIG. 8 a schematic flow diagram of the configuration method applied by the optical transceiver to be configured in connection with the flow diagram in FIG. 6.

FIG. 8 shows a flow diagram of an exemplary process run by the control units of the transceivers 11 at the first end 7 (acting as slaves) interacting with the above-explained processes according to FIGS. 7A to 7C.

As apparent from FIG. 8, a newly added or reactivated transceiver 11 sweeps the optical frequency of the respective transmitter 17 over the optical channels of the first set of channel. As the loop is rather similar to FIG. 6 and the flow diagram is practically self-explaining, the following description is limited to the essential differences. In each cycle of the loop, the information concerning the loop counter i (relating to the optical wavelength of the optical channel signal $S1_{ch,i}$ created during this loop cycle) and the time at which the channel signal has been switched to this wavelength (and at which the respective ID information has been sent on the respective control channel using the channel tone frequency $f_{new}$) is stored, preferably written to a table.

In each cycle of the loop, the control unit 37 detects the messages included within the downstream control channel (in FIG. 8, the term RX tone refers to the respective control channel at $f_{WDM}$ included in the channel signal $S2_{ch,i}$ received by the transceiver 11) and addressed to the respective transceiver 11 for a predetermined duration or time interval $t_{packet}$, which is chosen long enough to receive all information sent by the central tuning device in a cycle of the loop according to FIG. 7B.

If no message at all is received or only messages addressed to other transceivers are received, the loop counter is increased by one and a new cycle is started during which the optical channel signal is created at the center wavelength of a next optical channel. If the sweeping process has been effected for the last optical channel and no message addressed to the respective transceiver 11 has been received, a full new sweeping process is started beginning with the first optical channel, i.e. the loop counter i is reset to i=1.

If a message addressed to the respective receiver is detected, the control unit 37 determines the time at which the central tuning device 3, 3' detected the optical channel signal created by the respective transceiver 11 using the current time (at the transceiver 11) and the time information received via the downstream control channel, i.e. the time difference information "timenow-time" or the time information "timenow" and "time" (see above). This receiving time is (neglecting the double signal delay time) equal to the time at which the respective channel signal (at the correct channel wavelength) has been sent by the transceiver (this time is referred to as TX time in FIG. 8). Thus, the control unit 37 can determine the correct wavelength using the time information included in the table and the calculated time information and control the optical transmitter 17 such that it creates the digital optical channel signal at the correct center wavelength. Further the transmitter is controlled such that the channel signal includes the control channel with the dedicated channel tone frequency $f_{ch,i}$. The transceiver finishes the configuration process with the transmission of an acknowledgment message on the control channel.

This configuration procedure according to FIGS. 7A-C and 8 allows the use of tunable (and also configurable) transceivers at both ends 7, 9 of the transmission link 5, 5' as the method takes into account the delayed transmission of the information between the transceivers 11 and the central tuning device 3, 3'.

Figure 9:
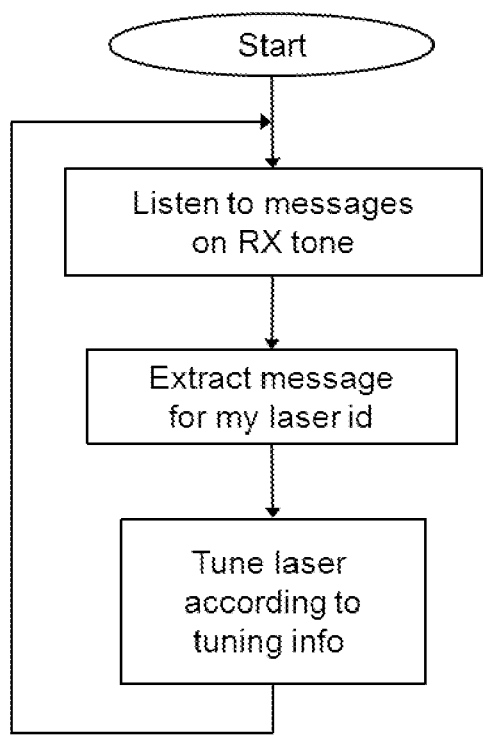
FIG. 9 a schematic flow diagram of a fine tuning method applied by the optical transceivers to optimally tune their center wavelengths.

FIG. 9 shows a flow diagram for the fine tuning process run by the slaves, i.e. by the control units 37 of the transceivers 11. Each of the transceivers 11 receives respective fine tuning information through the downstream control channel included within the second WDM transmission signal $S2_{WDM}$ and the optical channel signals $S2_{ch,i}$. Each transceiver extracts the information addressed to it and controls, i.e. fine-tunes the tunable optical transmitter 17 accordingly. This fine tuning process may be run continuously, in periodic time intervals or on request.

The fine tuning information is determined at the central tuning device 3, 3' by detecting and, if applicable, processing and evaluating the information included in the opto-electrically converted WDM detection signal $S_{det,WDM}$ or one or more optically filtered WDM detection signals as explained above.

Referring generally, to the forgoing description, as used herein the terms "comprising," "including," "carrying," "having" "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent and Trademark Office Manual of Patent Examining Procedures. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The foregoing has outlined rather broadly the features and technical advantages of the present invention in order that the detailed description of the invention that follows may be better understood. It should be appreciated by those skilled in the art after appreciating this specification that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

Although the present invention and its advantages have been described in detail, it should be understood that various changes, substitutions and alterations can be made herein without departing from the spirit and scope of the invention as defined by the appended claims. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some subcombination of the features herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

LIST OF REFERENCE SIGNS 1 optical WDM transmission system (dual-fiber link)
1' optical WDM transmission system (single-fiber link)
3 central tuning device
5 optical WDM transmission link (dual-fiber)
5' optical WDM transmission link (single-fiber)
7 first/western end
9 second/eastern end
11 first, second optical transceivers
11a input port
11b output port
13 multiplexer, multiplexing means
15 demultiplexer, demultiplexing means
17 tunable optical transmitter
19 means for optically combining/separating optical paths, optical diplexer, optical circulator
21 optical splitter
23 optical splitter
25 detection device
27 channel presence detecting device 29 control device
31 optical modulator device
33 means for optically combining/separating optical paths, optical diplexer, optical circulator
35 optical receiver
37 controller unit
$S1_{ch,i}$ first digital optical channel signals, i=1 ... n, i is an integer value
$S2_{ch,i}$ second digital optical channel signals, i=1 ... n, i is an integer value
$S_{det,WDM}$ optical WDM detection signal
$S_{mod}$ modulation signal
$f_{ch,i}$ channel tone frequency, i=1 ... n, i is an integer value
$f_{tone,WDM}$ WDM tone frequency
$f_{new}$ channel tone frequency of a newly added first optical channel signal

The invention claimed is:

1. An optical WDM transmission system including:
   (a) a plurality of first optical transceivers at a first end of an optical WDM transmission link, each of the first optical transceivers including a tunable optical transmitter being configured to create a first digital optical channel signal within the bandwidths of a set of first optical channels of the optical WDM transmission system according to tuning control information,
   (b) multiplexing means for multiplexing the first digital optical channel signals into a first optical WDM signal, which is supplied to the first end of the optical WDM transmission link,
   (c) a plurality of second optical transceivers at a second end of the optical WDM transmission link, each of the second optical transceivers including an optical transmitter being configured to create a second digital optical channel signal within the bandwidth of a predetermined optical channel of a second set of optical channels of the optical WDM transmission system,
   (d) multiplexing means for multiplexing the second digital optical channel signals into a second optical WDM signal, which is supplied to the second end of the optical WDM transmission link,
   (e) demultiplexing means for demultiplexing the second optical WDM signal into the second digital optical channel signals and providing each of the second digital optical channel signals to a dedicated first optical transceiver, and
   (f) a central tuning device connected in the optical path between the first optical transceivers and the second optical transceivers, and configured to create the tuning control information for one or more selected or all of the first optical transceivers by
      (i) tapping off an optical WDM detection signal from the first optical WDM signal,
      (ii) extracting a tuning status information from the optical WDM detection signal and determining tuning control information for at least one of the first transceivers,
   (g) the central tuning device being further configured to supply the tuning control information to the at least one first transceiver by modulating the second optical WDM signal according to the tuning control information applying an amplitude modulation of the second optical WDM signal using a dedicated WDM tone frequency as a carrier frequency which is modulated according to the tuning control information.

2. The optical WDM transmission system of claim 1, characterized in that the central tuning device includes an optical modulator device for creating the amplitude modulation of the second optical WDM signal and that the first optical transceivers are configured to detect the tuning control information included in the WDM tone frequency amplitude modulation of the respective second optical WDM signal which is also present within each second digital optical channel signal.

3. The optical WDM transmission system of claim 1, characterized in that the first optical transceivers apply an amplitude modulation of the respective first digital optical channel signal using a respective dedicated channel tone frequency as a carrier frequency and that the central tuning device is configured to create a tuning status information with respect to one or more selected or all first digital optical channel signals by opto-electrically converting the optical WDM detection signal or an optical signal obtained from the optical WDM detection signal and narrow-band filtering the respective converted electrical signal with respect to the dedicated channel tone frequency, the tuning status information characterizing the current spectral position of the respective first digital optical channel signal with respect to a desired spectral position within the respective optical channel or whether or not a first digital optical channel signal is received within a predetermined optical channel.

4. The optical WDM transmission system of claim 3, characterized in that the first optical transceivers are configured to modulate the respective channel tone frequency according to a signaling information to be transmitted to the central tuning device and that the central tuning device is configured to detect the signaling information which is included within the amplitude modulation of the first digital optical channel signals.

5. The optical WDM transmission system of claim 4, characterized in that the signaling information includes an identification information that is unique for each of the first optical transceivers and that the central tuning device uses the identification information within the amplitude modulation of the second optical WDM signal for addressing the tuning control information to the respective first optical transceivers.

6. The optical WDM transmission system of claim 3, characterized in that the central tuning device includes a detection device including an opto-electrical detector configured to detect the optical WDM detection signal.

7. The optical WDM transmission system of claim 3, characterized in that the central tuning device includes a detection device including at least one optical filter device, which receives the optical WDM detection signal as an input signal, and at least one opto-electrical detector configured to opto-electrically detect the at least one optically filtered optical WDM detection signal that has passed through the at least one optical filter device.

8. The optical WDM transmission system of claim 6, characterized in that the central tuning device includes a control device configured to
   (a) determine, for one or more selected or all first digital optical channel signals, the tuning status information using one or more electrical output signals of the at least one opto-electrical detector of the detection device, which is supplied to the control device, and
   (b) to determine, for one or more selected or all first digital optical channel signals, a tuning control information using the tuning status information and, optionally, a tuning reference information, such as tuning target values stored in the control device.

9. The optical WDM transmission system of claim 8, characterized in that the central tuning device includes a channel presence detecting device to detect the presence of first optical channel signals within the first optical WDM signal and to provide this information to the control device.

10. The optical WDM transmission system of claim 3, characterized in that each of the first optical transceivers is configured to control the respective tunable optical transmitter during a configuration mode such
   (a) that it transmits the respective first optical channel signal within a first one of the channels of the set of first channels, if the first optical transceiver is reactivated or activated for the first time, the channel tone frequency of the amplitude modulation of the first optical cannel signal being set to a "new" frequency value,
   (b) that it sweeps the respective first optical channel signal to a respective next channel of the set of first channels, as long as no respective message directed to the respective optical transceiver is detected in the tuning control information within a preset sweep interval, and
   (c) that, having received a respective tuning control information, it maintains the transmitted first optical channel signal within the actual optical channel and switches the channel tone frequency from the "new" frequency value to a dedicated channel tone frequency included in the tuning control information received or
   (d) that, having received a respective tuning control information, it determines the optical channel to be used from the information included in the tuning control information received and tunes the optical transmitter such that the first optical channel signal is transmitted within this optical channel and that it switches the channel tone frequency from the "new" value to a dedicated channel tone frequency included in the tuning control information received.

11. The optical WDM transmission system of claim 10, characterized in that each of the first optical transceivers is configured to determine the optical channel to be used from a time difference value included in the tuning control information received and the current time, wherein the time difference value is determined by the central tuning device, the central tuning device being configured to calculate the time difference value as the difference of the current time at which the respective information has been transmitted to the respective first optical receiver and the time at which the respective new first optical channel signal has been detected by the central tuning device.

12. The optical WDM transmission system of claim 10, wherein the central tuning device includes a channel presence detecting device configured to detect the presence of first optical channel signals within the first optical WDM signal and to provide this information to the control device, and wherein the control device is configured to detect whether and in which optical channel a new first optical channel signal has been added to the optical WDM detection signal using the information provided by the channel presence detecting device, and, if so, to transmit to the respective first optical transceiver as tuning information the information concerning the respective dedicated channel tone frequency.

13. The optical WDM transmission system of claim 12, characterized in that the control device is configured to repeat the transmission of the tuning information until it detects an acknowledgement information from the respective first optical transceiver.

14. The optical WDM transmission system of claim 12, characterized in that the control device is configured to transmit a "WAIT AND RESTART" information to all first optical transceivers if the control device detects, from information provided by the channel presence detecting device, the presence of two or more newly added first optical channel signals and that those two or more first optical transceivers, as a reaction to the receipt of a "WAIT AND RESTART" information, interrupt the sweeping process and restart the configuration process after a given time interval, preferably a random time interval.

15. A central tuning device for an optical WDM transmission system,
   (a) the optical WDM transmission system including
      (i) a plurality of first optical transceivers at a first end of an optical WDM transmission link, each of the first optical transceivers including a tunable optical transmitter being configured to create a first digital optical channel signal within the bandwidths of a set of first optical channels of the optical WDM transmission system according to tuning control information,
      (ii) multiplexing means for multiplexing the first digital optical channel signals into a first optical WDM signal, which is supplied to the first end of the optical WDM transmission link,
      (iii) a plurality of second optical transceivers at a second end of the optical WDM transmission link, each of the second optical transceivers including an optical transmitter being configured to create a second digital optical channel signal within the bandwidth of a predetermined optical channel of a second set of optical channels of the optical WDM transmission system,
      (iv) multiplexing means for multiplexing the second digital optical channel signals into a second optical WDM signal, which is supplied to the second end of the optical WDM transmission link,
      (v) demultiplexing means for demultiplexing the second optical WDM signal into the second digital optical channel signals and providing each of the second digital optical channel signals to a dedicated first optical transceiver,
   (b) the central tuning device comprising:
      (i) a detection device configured to be connected in the optical path between the first optical transceivers and the second optical transceivers and to tap off an optical WDM detection signal from the first optical WDM signal,
      (ii) a control device adapted to receive and process optoelectrically converted signals received from the detection device to create the tuning control information for one or more selected or all of the first optical transceivers by extracting a tuning status information from the optical WDM detection signal and determining tuning control information for at least one of the first transceivers, and
      (iii) an optical modulator device configured to supply the tuning control information to the at least one first transceiver by modulating the second optical WDM signal according to the tuning control information applying an amplitude modulation of the second optical WDM signal using a dedicated WDM tone frequency.

16. An optical transceiver for an optical WDM transmission system,
   (a) the optical WDM transmission system including
      (i) a plurality of first optical transceivers at a first end of an optical WDM transmission link, each of the first optical transceivers including a tunable optical transmitter being configured to create a first digital optical channel signal within the bandwidths of a set of first optical channels of the optical WDM transmission system according to a tuning control information, (ii) multiplexing means for multiplexing the first digital optical channel signals into a first optical WDM signal, which is supplied to the first end of the optical WDM transmission link, (iii) a plurality of second optical transceivers at a second end of the optical WDM transmission link, each of the second optical transceivers including an optical transmitter being configured to create a second digital optical channel signal within the bandwidth of a predetermined optical channel of a second set of optical channels of the optical WDM transmission system, (iv) multiplexing means for multiplexing the second digital optical channel signals into a second optical WDM signal, which is supplied to the second end of the optical WDM transmission link, (v) demultiplexing means for demultiplexing the second optical WDM signal into the second digital optical channel signals and providing each of the second digital optical channel signals to a dedicated first optical transceiver, (vi) a central tuning device configured to be connected in the optical path between the first optical transceivers and the second optical transceivers, and configured to create the tuning control information for one or more selected or all of the first optical transceivers by tapping off an optical WDM detection signal from the first optical WDM signal, extracting a tuning status information from the optical WDM detection signal and determining tuning control information for at least one of the first transceivers, the central tuning device being further configured to supply the tuning control information to the at least one first transceiver by modulating the second optical WDM signal according to the tuning control information applying an amplitude;

(b) wherein the optical transceiver is configured to be connected as one of the first optical transceivers in the optical WDM transmission system, and is further configured to detect the tuning control information supplied by the central tuning device and included in the WDM tone frequency amplitude modulation of the respective second optical WDM signal which is also present within each second digital optical channel signal.

17. A method for tuning a plurality of tunable optical transmitters in an optical WDM transmission system including the steps of:

(a) creating, according to tuning control information, a plurality of first digital optical channel signals within the bandwidths of a set of first optical channels of the optical WDM transmission system by means of the plurality of tunable optical transmitters, (b) multiplexing the first digital optical channel signals into a first optical WDM signal and supplying same to a first end of an optical WDM transmission link, (c) creating a plurality of second digital optical channel signals within the bandwidth of a predetermined optical channel of a second set of optical channels of the optical WDM transmission system, each of the second digital optical channel signals being paired with a dedicated first digital optical channel signal for establishing a bi-directional communication link, (d) multiplexing the second digital optical channel signals into a second optical WDM signal and supplying same to a second end of the optical WDM transmission link, (e) receiving the second optical WDM signal at the first end of the optical WDM transmission link and demultiplexing same into the second digital optical channel signals, and (f) at a central location, creating the tuning control information for tuning the first digital optical channel signals within respect to the first optical channels by
  (i) between the first and second ends of the optical WDM transmission link, tapping off an optical WDM detection signal from the first optical WDM signal, and
  (ii) extracting tuning status information from the optical WDM detection signal and determining tuning control information for at least one of the first digital optical channel signals, and
  (iii) modulating the second optical WDM signal according to the tuning control information applying an amplitude modulation of the second optical WDM signal using a dedicated WDM tone frequency; and (g) detecting, at the locations of the tunable optical transmitters, the control information for the at least one of the first digital optical channel signals by demodulating the second digital optical channel signals.

18. The method according to claim 17, characterized by the step of applying an amplitude modulation of the respective first digital optical channel signal using a respective dedicated channel tone frequency as a carrier frequency and creating tuning status information with respect to one or more selected or all first digital optical channel signals by opto-electrically converting the optical WDM detection signal an optical signal obtained from the optical WDM detection signal and narrow-band filtering the respective converted electrical signal with respect to the dedicated channel tone frequency, the tuning status information characterizing the current spectral position of the respective first digital optical channel signal with respect to a desired spectral position within the respective optical channel and/or whether or not a first digital optical channel signal is received within a predetermined optical channel.

* * * * *